(12) United States Patent
Lee et al.

(10) Patent No.: US 9,691,034 B2
(45) Date of Patent: Jun. 27, 2017

(54) MACHINE-LEARNING ACCELERATOR (MLA) INTEGRATED CIRCUIT FOR EXTRACTING FEATURES FROM SIGNALS AND PERFORMING INFERENCE COMPUTATIONS

(71) Applicant: The Trustees of Princeton University, Princeton, NJ (US)

(72) Inventors: Kyong Ho Lee, Plano, TX (US); Naveen Verma, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 496 days.

(21) Appl. No.: 14/277,484

(22) Filed: May 14, 2014

(65) Prior Publication Data
US 2014/0344194 A1 Nov. 20, 2014

Related U.S. Application Data

(60) Provisional application No. 61/823,055, filed on May 14, 2013.

(51) Int. Cl.
*G06N 5/04* (2006.01)
*G06N 99/00* (2010.01)

(52) U.S. Cl.
CPC ............ *G06N 99/005* (2013.01); *G06N 5/04* (2013.01)

(58) Field of Classification Search
None
See application file for complete search history.

(56) References Cited

U.S. PATENT DOCUMENTS 7,275,208 B2 * 9/2007 Uramoto ............... G06F 17/272
707/999.1
2007/0073266 A1 3/2007 Chmiel et al.
(Continued)

FOREIGN PATENT DOCUMENTS

WO 2010126624 A1 11/2010

OTHER PUBLICATIONS

Patel, et al., SystemC Kernel Extensions for Heterogeneous System Modeling: A Framework for Multi-MoC Modeling and Simulation, Chapter 7, Kluwer Academic Publishers, 2004, pp. 125-132.*
(Continued)

*Primary Examiner* — Wilbert L Starks
(74) *Attorney, Agent, or Firm* — Withrow & Terranova, P.L.L.C.

(57) ABSTRACT

A machine-learning accelerator (MLA) integrated circuit for extracting features from signals and performing inference computations is disclosed. The MLA integrated circuit includes a framework of finite state machine (FSM) kernels that are machine-learning algorithms implemented in hardware. The MLA integrated circuit further includes a kernel controller having mathematical structures implemented in hardware in communication with the framework of FSM kernels. An arithmetic engine implemented in hardware within the MLA integrated circuit is in communication with the kernel controller to perform computations for the mathematical structures. In at least one embodiment, the MLA integrated circuit includes a compression decompression accelerator (CDA) implemented in hardware and coupled between a memory and the kernel controller for compressing data to be stored in the memory and for decompressing data retrieved from the memory.

19 Claims, 9 Drawing Sheets

(56) References Cited

U.S. PATENT DOCUMENTS

| | | |
|---|---|---|
| 2008/0194925 A1 | 8/2008 | Alsafadi et al. |
| 2009/0265297 A1 | 10/2009 | Misra et al. |
| 2010/0280334 A1 | 11/2010 | Carlson et al. |
| 2010/0280574 A1 | 11/2010 | Carlson et al. |
| 2012/0101401 A1 | 4/2012 | Faul et al. |
| 2012/0316687 A1 | 12/2012 | Chen et al. |
| 2013/0080808 A1 | 3/2013 | Verma et al. |

OTHER PUBLICATIONS

Non-Final Office Action for U.S. Appl. No. 13/247,126, mailed Aug. 29, 2014, 23 pages.
Ashouei, M., et al., "A voltage-scalable biomedical signal processor running ECG using 13pJ/cycle at 1MHz and 0.4V," IEEE International Solid-State Circuits Conference, 2011, pp. 332-334.
Awais Bin Altaf, Muhammad, et al., "A 1.83 µJ/Classification Nonlinear Support-Vector-Machine-Based Patient-Specific Seizure Classification SoC," IEEE International Solid-State Circuits Conference, 2013, pp. 100-102.
Cadambi, Srihari, et al., "A Massively Parallel FPGA-based Coprocessor for Support Vector Machines," 17th IEEE Symposium on Field Programmable Custom Computing Machines, 2009, pp. 115-122.
Genov, R., et al., "Kerneltron: Support vector 'machine' in silicon," IEEE Transactions on Neural Networks, vol. 14, No. 5, Sep. 2003, pp. 1426-1434.
Hsu, Chih-Wei, et al., "A Practical Guide to Support Vector Classification," Department of Computer Science, National Taiwan University, Apr. 15, 2010, 16 pages.
Kwong J., et al., "An energy-efficient biomedical signal processing platform," IEEE Journal of Solid-State Circuits, vol. 46, No. 7, Jul. 2011, pp. 1742-1753.
Kwong J., et al., "A 65 nm Sub-Vt Microcontroller with Integrated SRAM and Switched Capacitor DC-DC Converter," IEEE Journal of Solid-State Circuits, vol. 44, No. 1, Jan. 2009, pp. 115-126.
Lee, K. H., et al., "A 1.2-0.55V general-purpose biomedical processor with configurable machine-learning accelerators for high-order, patient-adaptive monitoring," in Proc. European Solid-State Circuits Conference, 2012, pp. 285-288.
Lee, K. H., et al., "A low-power processor with configurable embedded machine-learning accelerators for high-order and adaptive analysis of medical-sensor signals," IEEE Journal of Solid-State Circuits, vol. 48, No. 7, Jul. 2013, pp. 1625-1637.
Lee, K. H., et al., "Improving kernel-energy trade-offs for machine learning in implantable and wearable biomedical applications," in Proc. IEEE Int. Conf. Acoustics, Speech and Signal Processing, May 2011, pp. 1597-1600.
Lee, Kyong Ho, "Low-Power Biomedical Processors with Embedded Machine-Learning Accelerators for Analytically-Intractable Physiological Signals," Dissertation, Department of Electrical Engineering of Princeton University, Nov. 2013, 183 pages.
Lee, Kyong Ho, et al., "A Low-Power Microprocessor for Data-driven Analysis of Analytically-intractable Physiological Signals in Advanced Medical Sensors," VLSI Symp. Circuits (VLSI), Jun. 2013, 2 pages.
Sarciada, Jesús Gimeno, et al., "CORDIC algorithms for SVM FPGA implementation," Proc. of SPIE, Independent Component Analyses, Wavelets, Neural Networks, Biosystems, and Nanoengineering VIII, vol. 7703, 2010, 8 pages.
Shalan, Mohamed, et al., "A Dynamic Memory Management Unit for Embedded Real-Time System-on-a-Chip," CASES '00 Proceedings of the 2000 International Conference on Compilers, Architecture, and Synthesis for Embedded Systems, Nov. 17-19, 2000, San Jose, CA, pp. 142-148.
Shoeb, A., et al., "A micropower support vector machine based seizure detection architecture for embedded medical devices," in Proc. IEEE Eng. Med. and Biol. Soc. Conf., Sep. 2009, pp. 4202-4205.
Sridhara, S. R., et al., "Microwatt embedded processor platform for medical system-on-chip applications," IEEE Journal of Solid-State Circuits, vol. 46, No. 4, Apr. 2011, pp. 721-730.
Verma N., et al., "A micro-power EEG acquisition SoC with integrated feature extraction processor for a chronic seizure detection system," IEEE Journal of Solid-State Circuits, vol. 45, No. 4, Apr. 2010, pp. 804-816.
Yoo, J., et al., "An 8-channel scalable EEG acquisition SoC with fully integrated patient-specific seizure classification and recording processor," IEEE International Solid-State Circuits Conference, 2012, pp. 292-294.
Non-Final Office Action for U.S. Appl. No. 13/247,126, mailed Jan. 13, 2014, 24 pages.
Final Office Action for U.S. Appl. No. 13/247,126, mailed Apr. 30, 2014, 23 pages.
Advisory Action for U.S. Appl. No. 13/247,126, mailed Jul. 17, 2014, 3 pages.
Final Office Action for U.S. Appl. No. 13/247,126, mailed Jan. 9, 2015, 24 pages.
Non-Final Office Action for U.S. Appl. No. 13/247,126, mailed Jul. 10, 2015, 34 pages.

* cited by examiner

| COMPARISON WITH VARIOUS LOW POWER PROCESSORS ENERGY / CLOCK CYCLE WITH VDD = 0.7V) | | | | | | |
|---|---|---|---|---|---|---|
| | LEE ESSCIRC, 2013 | KWONG ESSCIRC, 2010 | ASHOUEI ISSCC, 2011 | SRIDHARA VLSI, 2010 | THIS WORK |
| CPU | 46.3 pJ | 46.0 pJ | 49.3 pJ | 65.2 pJ | 52.3 pJ |
| SVM | 53.8 pJ | X | X | X | 32.2 pJ |
| GMM | X | X | X | X | 60.2 pJ |
| DWT | X | X | X | X | 34.3 pJ |
| AL | 41.2 pJ | X | X | X | 28.7 pJ |
| DCU | X | 44.2 pJ (FIR) | X | X | 51.8 pJ |
| CORDIC | X | 19.6 pJ | X | X | 23.7 pJ |
| MAXMIN | X | X | X | X | 22.4 pJ |
| CDA | X | X | X | X | 8.4 pJ |
| TECHNOLOGY | 130 nm | 130 nm | 90 nm | 130 nm | 130 nm |

FIG. 9

MACHINE-LEARNING ACCELERATOR (MLA) INTEGRATED CIRCUIT FOR EXTRACTING FEATURES FROM SIGNALS AND PERFORMING INFERENCE COMPUTATIONS

RELATED APPLICATIONS

This application claims the benefit of U.S. provisional patent application No. 61/823,055, filed May 14, 2013, the disclosure of which is incorporated herein by reference in its entirety.

GOVERNMENT SUPPORT

This invention was made with Government support under HR0011-13-3-0002, awarded by the United States Department of Defense, Defense Advanced Research Projects Agency. The Government has certain rights in the invention.

FIELD OF THE DISCLOSURE

The present disclosure relates to energy efficient battery-operated or self-powered devices for extracting features from signals and performing inference computations.

BACKGROUND

Machine-learning modeling frameworks can broadly be divided into discriminative and generative categories. Discriminative frameworks take a simplistic approach by modeling the underlying process as a particular variable. While this is adequate for many applications, the actual processes are, in fact, much more complex. For example, in electro-encephalography (EEG) based seizure detection using a discriminative model such as a support-vector-based classification, in which an application simply focuses on detecting seizures or non-seizures. In fact, neurological processes that lead to a seizure are more complicated, as there are dynamics during the onset of the seizure. Data representing this underlying dynamic gradually traverses a feature space from a non-seizure space, and eventually crosses the decision boundary to a seizure space.

Generative frameworks attempt to model the underlying processes more richly for applications where such characteristics might be important. For example, during a sleep stage, monitoring a combination of Gaussian mixture models (GMMs) and hidden Markov models (HMMs) is used to identify a sleep stage by detecting patterns of state transitions.

While physiological signals for biomedical applications have some of the most analytically intractable features, other non-biomedical such as robotics benefit from machine-learning. For example, machine-learning is employed in robotics for 3D scene analysis and manipulator actuation and so forth. As such, many of the same types of machine-learning frameworks are used in biomedical applications and employed in robotics.

These examples illustrate that different modeling frameworks are required to address the processes encountered in different applications. Thus, there is a need for a machine-learning accelerator (MLA) integrated circuit to support a range of computations required in these various machine-learning frameworks while employing a specialized architecture that can exploit the algorithmic structure described previously in order to achieve low energy.

SUMMARY

The present disclosure provides a machine-learning accelerator (MLA) integrated circuit for extracting features from signals and performing inference computations. The MLA integrated circuit includes a framework of finite state machine (FSM) kernels that are machine-learning algorithms implemented in hardware. The MLA integrated circuit further includes a kernel controller having mathematical structures implemented in hardware in communication with the framework of FSM kernels. An arithmetic engine implemented in hardware within the MLA integrated circuit is in communication with the kernel controller to perform computations for the mathematical structures. In at least one embodiment, the MLA integrated circuit includes a compression decompression accelerator (CDA) implemented in hardware and coupled between a memory and the kernel controller for compressing data to be stored in the memory and for decompressing data retrieved from the memory.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 9 is a table that provides a comparison of energy per cycle between various low power processors.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims. Moreover, for the purpose of this disclosure, the phrase "implemented in hardware" means an electrical circuit performs operations in place of software.

For example, application specific integrated circuits (ASICs) are typically used to realize algorithms implemented in hardware.

Figure 1:
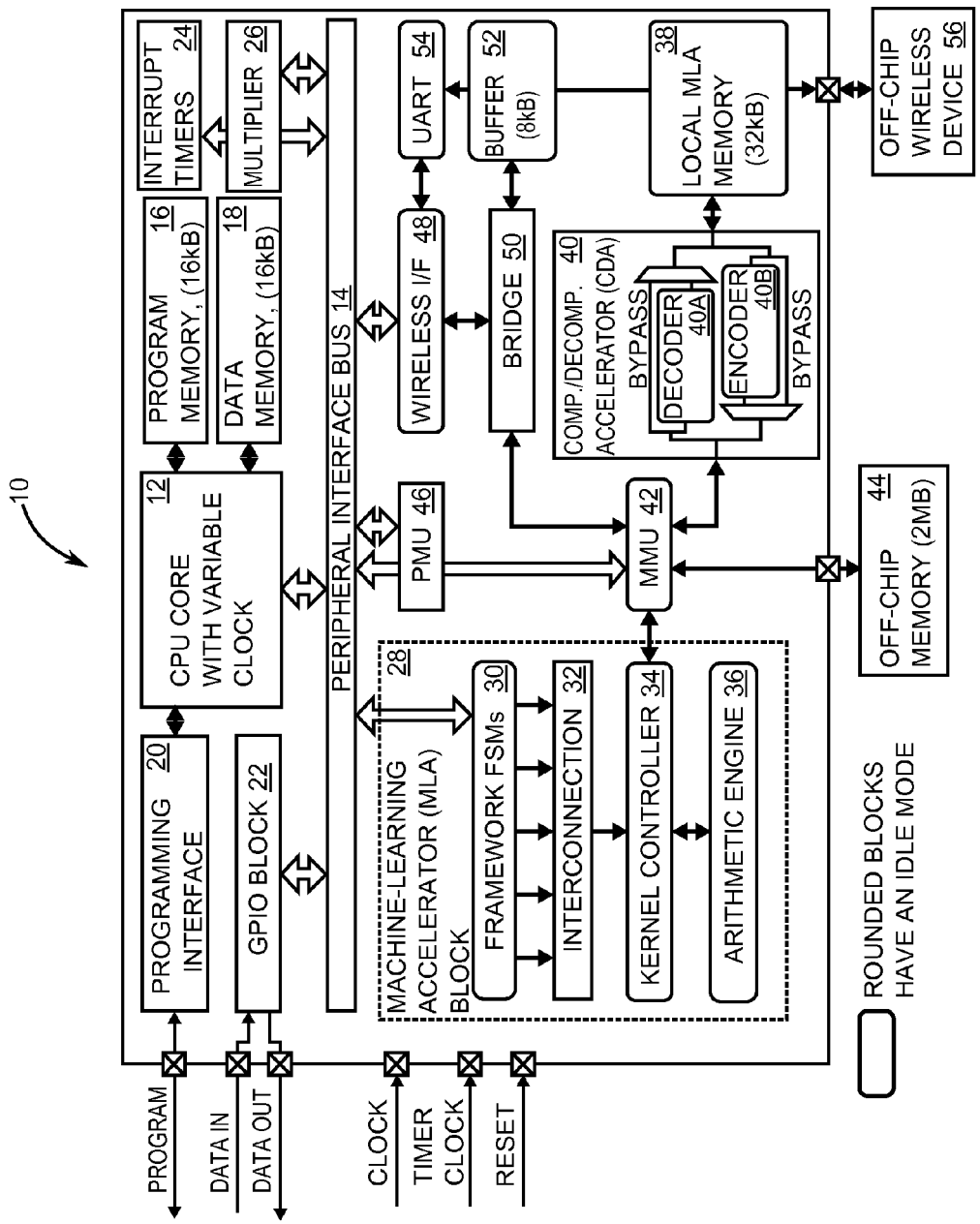
FIG. 1 is a block diagram depicting one embodiment of a machine-learning accelerator (MLA) integrated circuit of the present disclosure.

FIG. 1 is a block diagram depicting an embodiment of a machine-learning accelerator (MLA) integrated circuit 10 of the present disclosure. A central processing unit (CPU) core 12 with a variable clock supports general purpose computations and performs top-level control of peripheral blocks through a peripheral interface bus 14. In an exemplary embodiment, the CPU core 12 has a Texas Instruments MSP430-compatible instruction set architecture, and is based on a design provided by "OpenCores.org", which is an open source hardware community developing digital open source hardware through electronic design automation. The CPU core 12 is interfaced with a program memory 16 and a data memory 18.

In a programming mode, a programming interface 20 halts the CPU core 12 and uploads a user program to the program memory 16. The user program begins to execute upon completion of the upload. The CPU core 12 communicates over the peripheral interface bus 14 wherein multiple peripheral blocks can be attached for control by the CPU core 12. One such peripheral block is a general purpose input/output (GPIO) block 22 that supports 16 b data-in and 16 b data-out ports for data communication to off-chip devices such as sensors with analog-to-digital converters (not shown). Interrupt timers 24 are also included to control CPU timing for the execution of specific software routines. A multiplier 26 supports programmable arithmetic computations. The CPU core 12, the program memory 16, and the data memory 18 do not support clock gating. As a result, the CPU core 12, the program memory 16, and the data memory 18 are always on. For power management, the clock cycle of the CPU core 12, the program memory 16, and the data memory 18 is adjustable via a software-controllable digital clock divider included with the CPU core 12 in order to support variable throughput requirements across various applications.

Another peripheral block is a machine-learning accelerator (MLA) block 28 that supports various machine-learning frameworks and feature-extraction computations at relatively low power. In particular, the MLA block 28 includes a framework of finite state machine (FSM) kernels 30 that is implemented in hardware, an interconnection 32 and a kernel controller 34 that is implemented in hardware that communicates with the framework of FSM kernels 30 via the interconnection 32. An arithmetic engine 36 implemented in hardware within the MLA block 28 is in communication with the kernel controller 34 to perform computations for mathematical structures implemented in hardware within the kernel controller 34.

The MLA block 28 is in communication with a local MLA memory 38 that stores embedded machine-learning models. The local MLA memory 38 also provides scratch space for computations. Yet another peripheral block is a compression decompression accelerator (CDA) 40 that is coupled between a memory management unit (MMU) 42 and the local MLA memory 38. The CDA 40 supports on-line data compression and decompression to reduce a typical memory footprint. In particular, the CDA 40 includes a decoder 40A that decompresses data that is retrieved from the local MLA memory 38. In contrast, an encoder 40B compresses data to be stored in the local MLA memory 38. However, data can be routed to bypass both the decoder 40A and the encoder 40B on the way from and to the local MLA memory 38, respectively.

The MMU 42 manages data transactions between the CPU core 12, the MLA block 28, and the local MLA memory 38. However, an optional off-chip memory module 44 is addressable through the MMU 42 if more memory than the local MLA memory 30 is required for a given application. In this exemplary case, the MMU 42 supports extension to an optional off-chip data memory of up to 2 MB.

The exemplary embodiment of MLA integrated circuit 10 shown in FIG. 1 also provides power management features. For example, in this particular embodiment, there are a total of 16 clock domains, where each of the blocks depicted with rounded corners have an idle mode that is supported by software-controllable clock gating via a power management unit (PMU) 46. There are also wireless communication blocks such as a wireless interface (I/F) 48 that processes wireless data through a bridge 50 coupled to a buffer 52. The wireless I/F 48 also controls wireless communication via a universal asynchronous receiver transceiver (UART) 54 that passes wireless data between external devices and the MLA integrated circuit 10 through control of an off-chip wireless device 56. In this exemplary case, the off-chip wireless device 56 is a Bluetooth protocol radio. This extends connectivity to wide-area networks by communicating through a gateway device such as a cellular telephone (not shown). The MMU 42 provides direct memory access (DMA) functionality to move data between the buffer 52 and the local MLA memory 38 without intervention from the CPU core 12. In general, the wireless communication blocks enable fast and convenient data transactions in the active learning framework, wherein large detection models and selected instances are moved between the buffer 52 and the local MLA memory 38. It is to be understood that the wireless data can be transmitted with light signal and acoustical signal as well, depending on environment and needed data rates. Therefore, the off-chip wireless device 56 is not limited to radio frequency applications.

Figure 2:
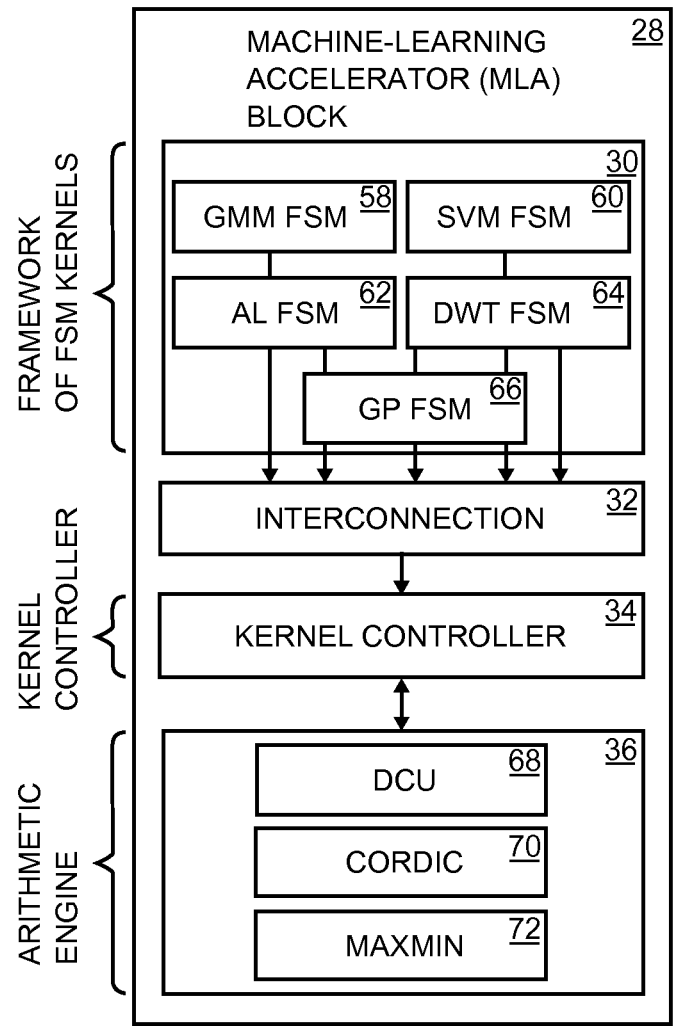
FIG. 2 is a block diagram depicting an MLA function block that is integral with the MLA integrated circuit, wherein the MLA function block includes a framework of finite state machines (FSMs), a kernel controller, and an arithmetic engine.

FIG. 2 is a block diagram that depicts additional details for the MLA block 28. In an exemplary embodiment, the framework of FSM kernels 30 is made up of a Gaussian mixture model (GMM) FSM kernel 58, a support vector machine (SVM) FSM kernel 60, an active learning (AL) FSM kernel 62, a discrete wavelet transform (DWT) FSM kernel 64, and a general purpose (GP) FSM kernel 66. The framework of FSM kernels 30 is implemented in hardware that is structured in combinable and flexible ways to support various computational frameworks required primarily for the machine-learning functions, but also for some feature-extraction computations. Variable configuration of the MLA block 28 enables low-energy support for data-driven modeling frameworks, including GMM, SVM regression/classification, active learning, HMM, etc. Variable configuration of the MLA block 28 also enables support for key feature-extraction kernels, such as principal component analysis (PCA), finite impulse response (FIR) filtering, discrete wavelet transform (DWT), discrete cosine transform (DCT), Kalman filtering, etc. The framework of FSM kernels 30 is controlled by the CPU core 12 for specific machine-learning and feature computations as well as general purpose computations via the GP FSM 66. The kernel controller 34 provides linear vector and matrix computations and non-linear transformations. Computations occur within the arithmetic engine 36. Computations for the kernel controller 34 are implemented by hardware blocks that compose the arithmetic engine 36. The hardware blocks include a data computation unit (DCU) 68 with a highly configurable microarchitecture, a coordinate digital computer (CORDIC) 70, and a maximum minimum (MAXMIN) function 72.

Figure 3:
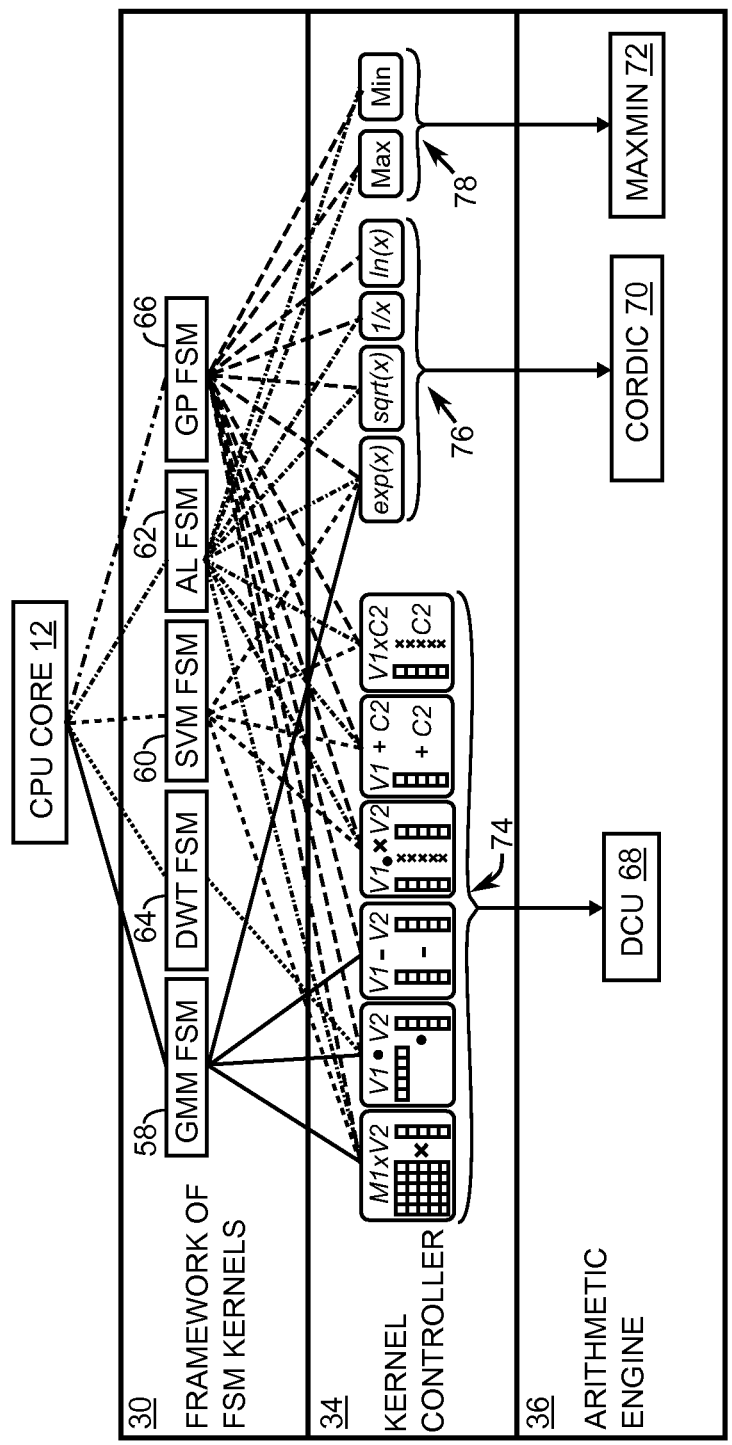
FIG. 3 is a communications diagram depicting communication paths between the framework FSMs, the kernel controller, and the arithmetic engine.

FIG. 3 is a communications diagram depicting communication paths between the framework of FSM kernels 30, the kernel controller 34, and the arithmetic engine 36. The kernel controller 34 supports various linear vector and matrix constructs 74 that include element-wise addition and multiplication of constants such as C2 as well as various non-linear transformations 76 such as exp, √x, ln x, 1/x. Unlike the DCU 68, which supports both 32 b and 16 b operations, the CORDIC 70 only supports 32 b operation as, typically, the non-linear transformations require larger dynamic range. The CORDIC 70 implements in hardware a conventional CORDIC algorithm with the addition of pre-scaling and post-scaling to extend the range of convergence. Maximum and minimum constructs 78 are usable for finding maximum values, minimum values, and indices from a data array. The MAXMIN function 72 is directed by the kernel controller 34 to determine the maximum values and minimum values for the maximum and the minimum constructs 78. As such, the kernel controller 34 can be thought of as a specialized DMA engine that is accessed by the framework of FSM kernels 30 to provide memory control as well as cycle-by-cycle configuration control of the underlying arithmetic engine 36. The MAXMIN function 72 is implemented in hardware and can be configured to search extreme values in a data array. The MAXMIN function 72 supports four search modes. These include finding maximum, minimum, maximum of absolute values, and minimum of absolute values. The MAXMIN function 72 also supports searching of either the extreme value or an index of the extreme value. Like the DCU 68, the MAXMIN function 72 also supports a serial 32*b* operation or two parallel 16 b operations. Therefore, the MAXMIN function 72 supports a total of 16 operating modes.

Figure 4:
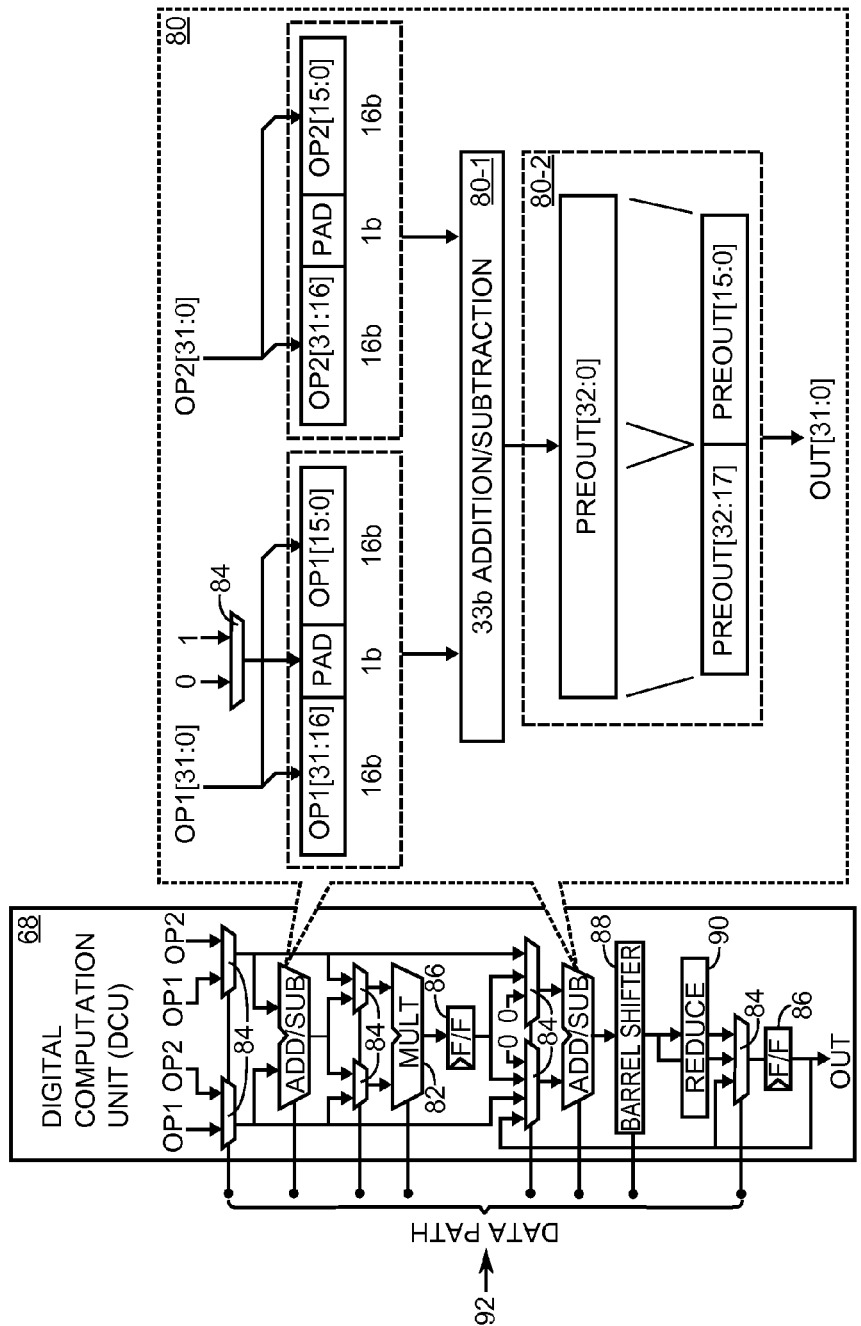
FIG. 4 is a detailed logic diagram of a digital computation unit (DCU) of the arithmetic engine highlighting addition/subtraction logic.

FIG. 4 is a detailed logic diagram of the DCU 68 highlighting addition/subtraction logic. The DCU 68 supports various linear vector and matrix computations through a configurable microarchitecture. FIG. 4 shows the microarchitecture of the DCU 68. Addition/subtraction (ADD/SUB) blocks 80 perform fixed-point addition and subtraction, and a multiplication (MULT) block 82 computes fixed-point multiplication. Computations performed by the DCU 68 are structured in stages with selectable operands shown in FIG. 4 as OP1 and OP2, enabling various data paths to be configured for the different kernels. To achieve this, configuration signals are provided by the kernel controller 34 in the MLA block 28 (FIG. 2). The DCU 68 is partitioned to a two-stage pipeline to reduce glitch propagation in order to save active energy for computations. The operands OP1 and OP2 as well as resultants are channeled through the DCU 68 via multiplexers 84. Flip-flops 86 are inserted in-line within the DCU 68 to mitigate active glitching and leakage energy by reducing a critical-path delay. Further still, a barrel shifter 88 is configurable to support variable precision by enabling in-line truncation. Moreover, a reduce block 90 coupled to an output of the barrel shifter 88 combines parallel computation outputs to generate a final output OUT.

DCU data paths 92 can be configured to support five modes of operation: (1) a multiplication and addition mode for matrix multiplication, (2) an add mode for matrix addition, (3) a subtraction mode for matrix subtraction, (4) a multiplication mode for element-wise matrix multiplication, and (5) a subtraction-multiplication-addition mode for performing squared vector distance calculations. As mentioned, the modes are configured by the kernel controller 34, as support for various computations in the machine-learning frameworks and feature-extraction computations are required. Since the DCU 68 is a critical resource, maximizing its utilization is an important concern. The DCU 68 can utilize two operands OP1 and OP2; the MMU 42 thus supports 2 times clock boosting to enable both operands OP1 and OP2 to be fetched from memory in one cycle.

From application profiling, it is found that one of the important challenges across the range of framework computations is the variable precision requirements. There are kernel functions in some applications that require 32 b precision, whereas 16 b is sufficient for other kernel functions. In addition, dynamic range requirements are variable for the various low-level computations involved. Two approaches are adopted to address dynamic range requirements. First, as shown in FIG. 4, the DCU 68 is designed to support both one 32 b computation and two parallel 16 b computations for fast and efficient kernel execution. Configurability for 32 b versus 16 b is achieved with low-overhead via the 33 b addition/subtraction block 80-1, wherein a PAD bit allows separation/merging of the two 16 b paths. The PAD bit is inserted as the 17th bit of the operand in the ADD/SUB blocks 80 to indicate either 32*b* serial or 16*b* parallel operations. If the PAD bit is 1 in addition, the carry propagates, so the DCU 68 runs in 32 b addition mode. On the other hand, if the PAD bit is 0, the carry does not propagate, so the DCU 68 runs as two parallel 16 b additions. If the PAD bit is 0 in subtraction, the 17th bit of the second operand becomes 1 under two's complement conversion, and the carry propagates to implement 32*b* subtraction. On the other hand, if the PAD bit is 1, this enables the least significant byte (LSB) 1 b addition required in two's complement conversion for the 16 b operands, and blocks carry propagation thus implementing 16*b* subtraction. The PAD bit results in a 33b number, and the bit value in the PAD location is discarded to generate the final result. Having enabled this in ADD/SUB blocks 80, a configurable multiplier that supports the variable precision paths is achieved through synthesis optimization, wherein part of the 32 b multiplier hardware is thus shared between two 16 b multiplier hardware blocks for area-efficient implementation. The resultant of the 33 b adder 80-1 is a 32 b preliminary output PREOUT[32:0] 8-2, which can also be separated as PREOUT[32:17] and PREOUT[15:0] before being output as OUT[31:0]. The second approach to support variable precision requirements is to use the configurable barrel shifter 88 to enable in-line truncation.

Figure 5:
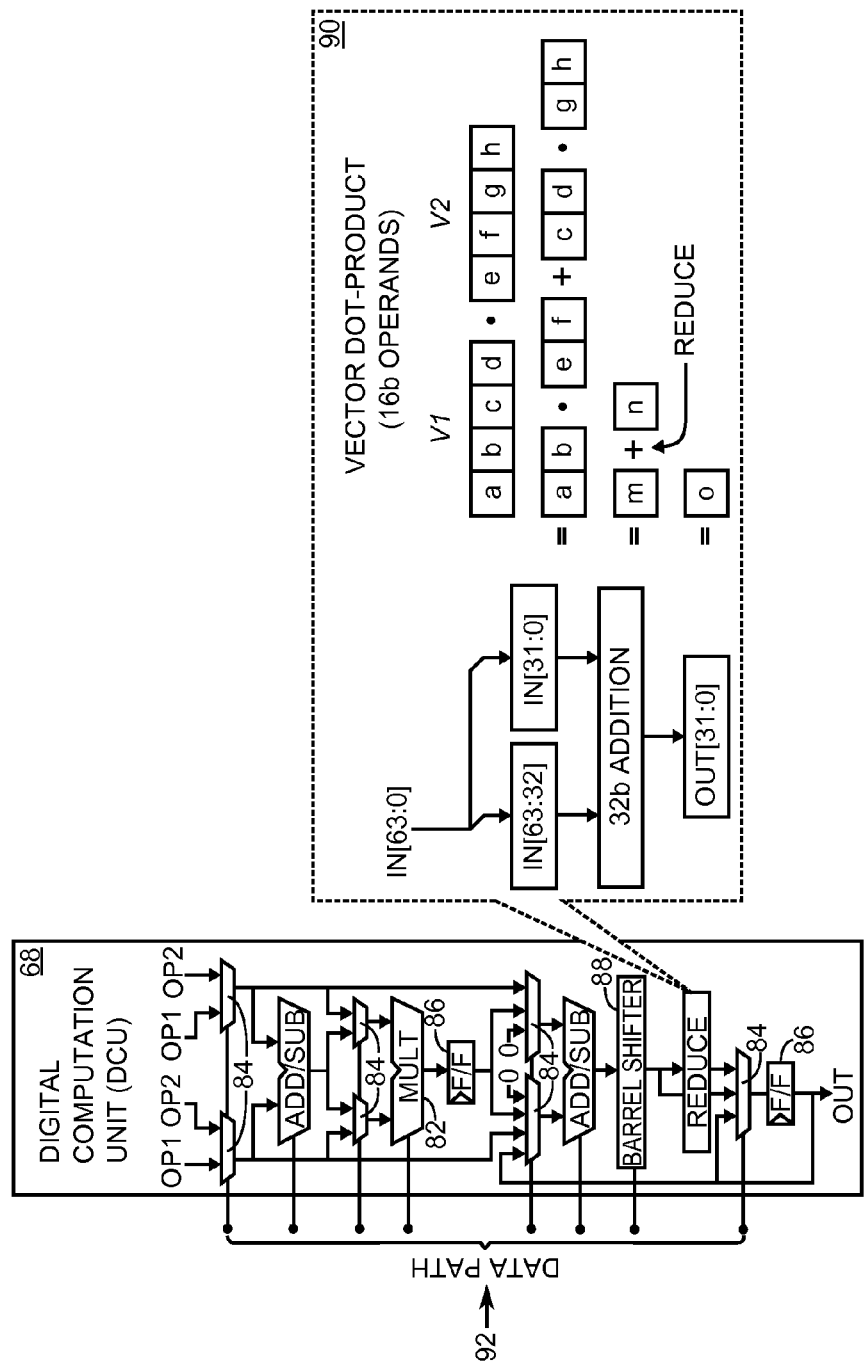
FIG. 5 is a logic diagram of the DCU highlighting a reduce logic function.

FIG. 5 is a logic diagram of the DCU 68 highlighting a reduced logic function via the reduce block 90. In parallel 16 b mode, the computation results in two outputs. It is thus ultimately necessary to combine the output results in the kernel function of interest. This is performed by the reduce block 90 at the end of the DCU architecture. Since element-wise computations such as addition, subtraction, and element-wise multiplication do not require combining the outputs, the reduce block 90 is typically activated in computational modes that involve vector and matrix multiplications. A common case is vector dot-product computation. In an example shown in FIG. 5, two vectors, V1 and V2, have four 16 b elements. As the DCU 68 runs in 16 b parallel mode, the vectors V1 and V2 are divided into two-element chunks, and the dot-product of each chunk is calculated in parallel. This generates two dot-product outputs, m and n, and the reduce block 90 adds the two results to generate the final output, o.

Figure 6:
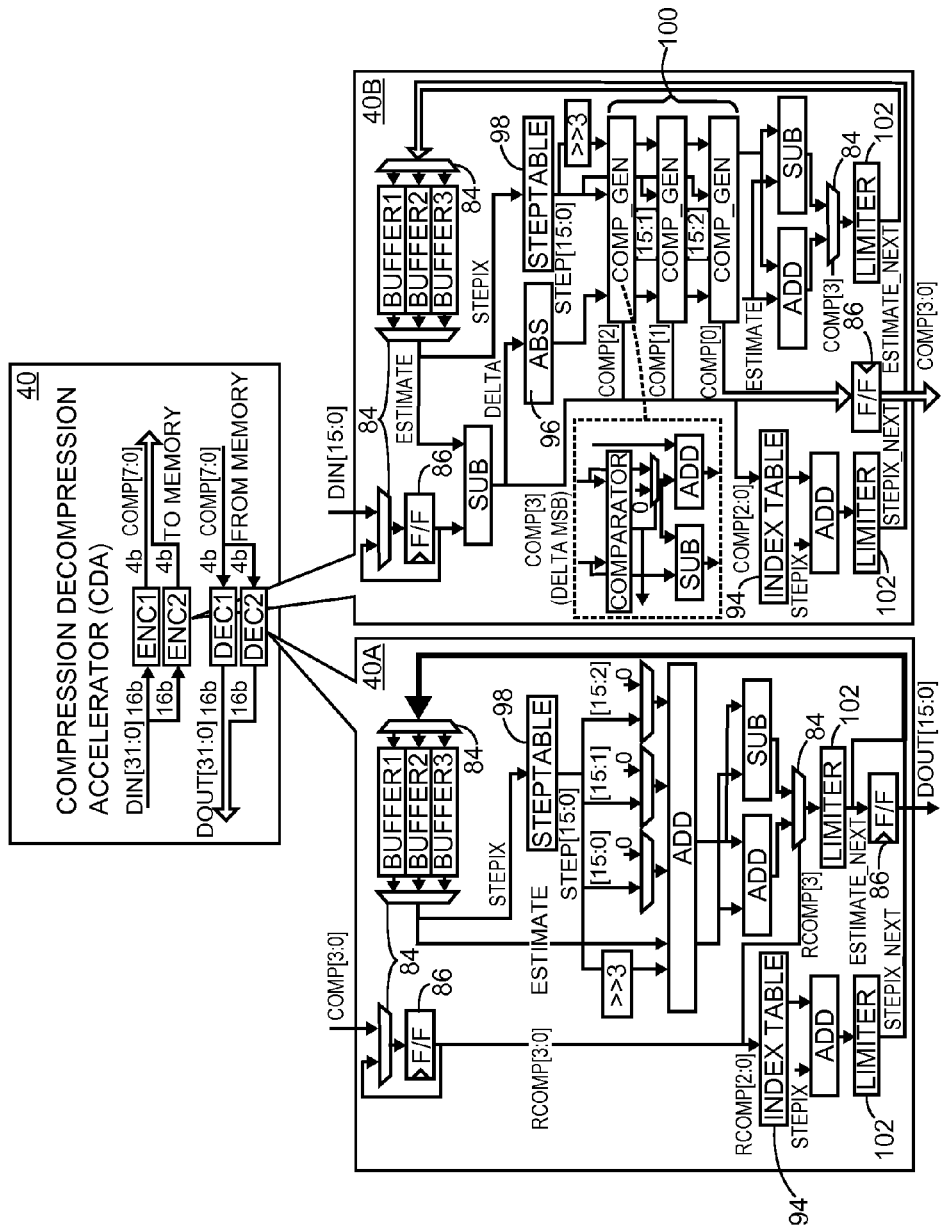
FIG. 6 is a logic diagram of a compression decompression accelerator (CDA).

FIG. 6 is a logic diagram that depicts detailed architecture of the CDA 40 that implements in hardware a data compression and decompression algorithm that is traditionally known as the adaptive differential pulse-code modulation (ADPCM) algorithm. The ADPCM algorithm provides on-line data compression and decompression with one clock cycle latency. Two encoder and decoder sets, ENC1, ENC2, and DEC1, DEC2, respectively, are employed to support both 32 b and 16 b data compression and decompression. Each encoder ENC1 and ENC2, and decoder DEC1 and DEC2/further include three buffers, BUFFER1, BUFFER2 and BUFFER3 to support up to three simultaneous operands. Each of the buffers, BUFFER1, BUFFER2 and BUFFER3, stores a running estimate for compression and decompression as well as a look-up table index for an adaptive step size. The three buffers enable two operands per clock for the DCU 68 (FIGS. 1-5), as well as an additional operand which can be used by the CPU core 12 (FIGS. 1 and 3).

Encoding involves maintaining a running estimate as well as a look-up index table 94 that provides an index STEPIX. The algorithm involves taking the difference between the 16 b input data and an estimate to calculate a delta. The MSB (i.e., sign bit) of the delta becomes the MSB of the 4 b compressed encoding, and an absolute value of the delta is taken by an absolute value block (ABS) 96, wherein the absolute value of the delta is used for encoding the remaining three bits. The index STEPIX is used to load the step from a step look-up table (i.e., STEPTABLE 98). Then, the absolute value of the delta and the step are compared to generate a compressed encoding bit, a new delta, and a new step size in the compensation generation (i.e., COMP_GEN blocks 100). If the delta is greater than the step, the delta is subtracted by the step to generate a new delta, and the step size is added to the step to generate a new step size; otherwise no computation occurs. The new delta and step size are successively computed in the subsequent compensation generation computations while deriving additional bits in the compressed encoding.

The compressed bits are then used to update the next estimate and the next index STEPIX using the look-up index table 94. The decoder 40A reverses the process. The index STEPIX loads the step in the look-up table (i.e., STEPTABLE 98) to generate multiple deltas using a shift operation. The deltas are selectively added depending on the bits of the compressed input data, RCOMP. The output is then added or subtracted to the running estimate depending on the MSB of the RCOMP to generate the decoded output; the decoded output is used as the next estimate. The next index STEPIX is also derived from the RCOMP from the look-up index table 94. Limiters 102 are used to prevent overflows that may occur with addition and subtract calculations.

Figure 7:
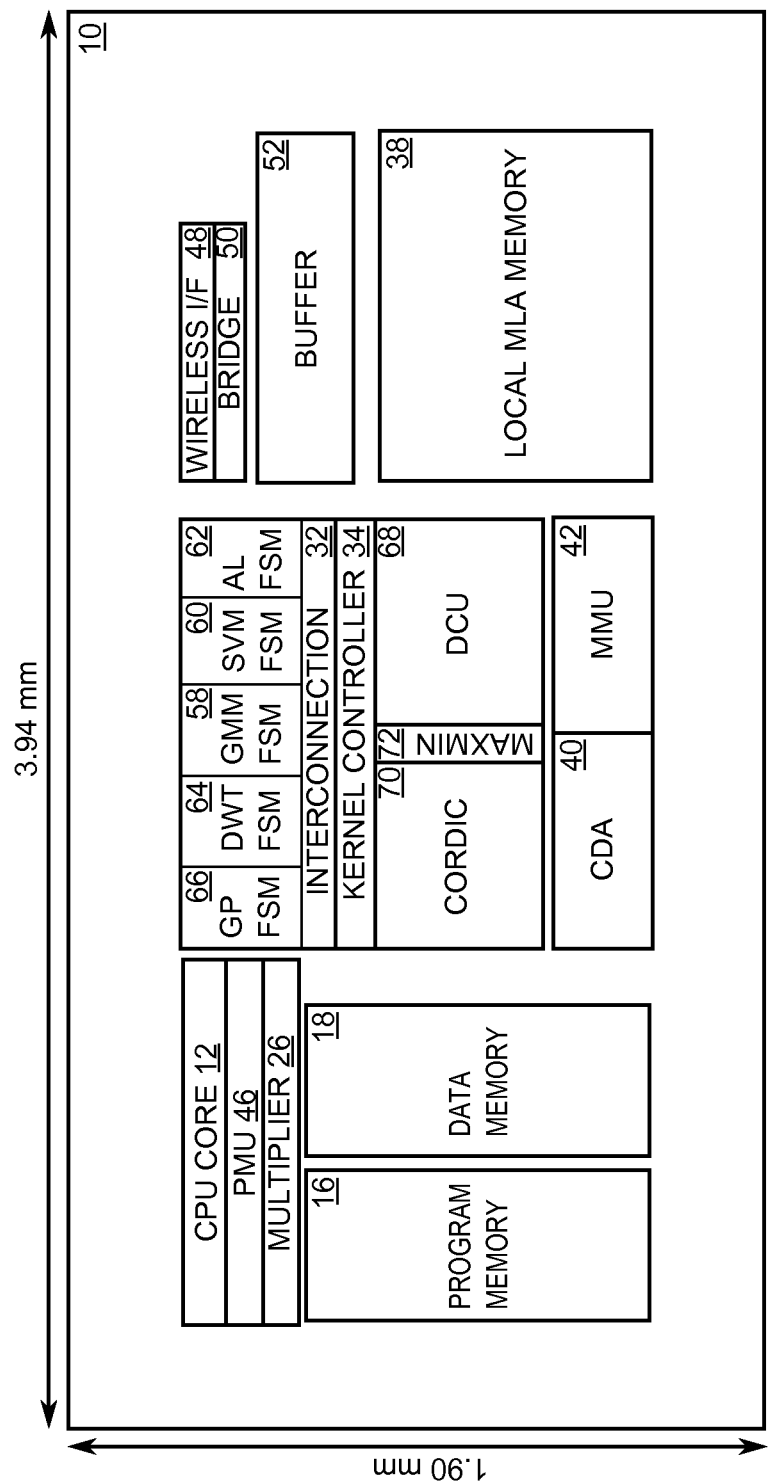
FIG. 7 is a line drawing of a 130 nm complementary metal oxide semiconductor (CMOS) application-specific integrated circuit that realizes one embodiment of the MLA integrated circuit of the present disclosure.

FIG. 7 is a line drawing of a 130 nm complementary metal oxide semiconductor (CMOS) low power (LP) application specific integrated circuit (ASIC) that realizes one embodiment of the MLA integrated circuit 10. The MLA integrated circuit 10 supports supply voltages from 1.2-0.7V, operating at 25 MHz-5.1 MHz. In at least one embodiment, each FSM kernel of the framework of FSM kernels consumes from 8 to 60 pJ at 0.7V and the CDA 40 consumes just 8% of the total energy consumed by the MLA integrated circuit 10 in a typical application. In an exemplary embodiment, the MLA integrated circuit 10 has a dimension 1.90 mm by 3.94 mm. In an additional exemplary embodiment, on the order of 431 k logic gates are used to realize the MLA integrated circuit 10.

Figure 8:
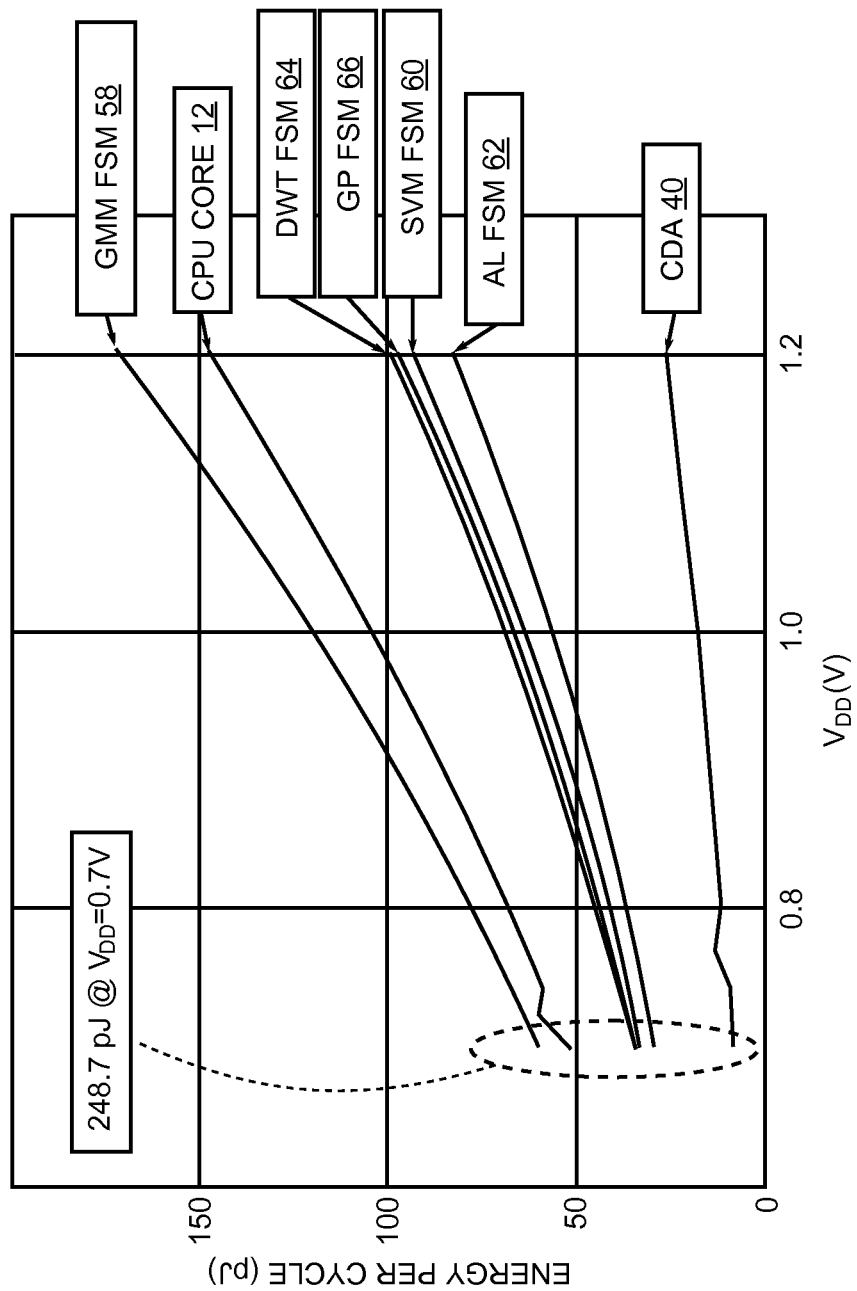
FIG. 8 is a graph depicting energy per cycle versus supply voltage.

FIG. 8 is a graph depicting energy per cycle versus supply voltage. Overall, the MLA integrated circuit 10 reduces the energy of typical applications by 3× to 497×. For most applications, the total power consumption is in the μW level, from 7 μW to 94 μW.

FIG. 9 is a table that provides a comparison of energy/cycle between various low power processors that individually perform one or more of the FSMs of the MLA integrated circuit 10. However, it is important to note that none of the other listed low power processors can implement all of the FSMs of the MLA integrated circuit 10 because they are not designed to include the flexible and user configurable hardware structures of the present disclosure. Therefore, the table of FIG. 9 only provides a combined comparison of energy/cycle instead of a comparison of capabilities and flexibility.

In general, the MLA integrated circuit 10 enables a range of biomedical sensor applications by supporting various machine-learning frameworks. Those skilled in the art will recognize improvements and modifications to the embodiments of the present disclosure. All such improvements and modifications are considered within the scope of the concepts disclosed herein and the claims that follow.

What is claimed is:

1. A machine-learning accelerator (MLA) integrated circuit for extracting features from signals and performing inference computations comprising:
   a framework of finite state machine (FSM) kernels that are machine-learning algorithms implemented in hardware;
   a kernel controller having mathematical structures implemented in hardware in communication with the framework of FSM kernels;
   an arithmetic engine implemented in hardware in communication with the kernel controller to perform computations for the mathematical structures; and
   a power management unit (PMU) that provides an idle-mode for the framework of FSM kernels, the kernel controller, and the arithmetic engine.

2. The MLA integrated circuit of claim 1 further including a peripheral interface bus for conveying data between a central processing unit (CPU) core and the framework of FSM kernels.

3. The MLA integrated circuit of claim 2 wherein the CPU core is implemented in hardware within the MLA integrated circuit.

4. The MLA integrated circuit of claim 3 wherein energy consumption per clock cycle for the CPU is around about 52 pJ for a power supply voltage of 0.7V.

5. The MLA integrated circuit of claim 1 wherein one of the FSM kernels is a Gaussian mixture model (GMM) FSM kernel.

6. The MLA integrated circuit of claim 5 wherein energy consumption of the GMM FSM kernel per clock cycle is around about 60 pJ for a power supply voltage of 0.7V.

7. The MLA integrated circuit of claim 1 wherein one of the FSM kernels is a support vector machine (SVM) FSM kernel.

8. The MLA integrated circuit of claim 7 wherein energy consumption of the SVM FSM kernel per clock cycle is around about 32 pJ for a power supply voltage of 0.7V.

9. The MLA integrated circuit of claim 1 wherein one of the FSM kernels is a discrete wavelet transform (DWT) FSM kernel.

10. The MLA integrated circuit of claim 9 wherein energy consumption of the DWT FSM kernel is around about 34 pJ for a power supply voltage of 0.7V.

11. The MLA integrated circuit of claim 1 wherein one of the FSM kernels is an active learning (AL) FSM kernel.

12. The MLA integrated circuit of claim 11 wherein energy consumption of the AL FSM kernel is around about 28 pJ for a power supply voltage of 0.7V.

13. The MLA integrated circuit of claim 1 wherein one of the FSM kernels is a general purpose (GP) FSM kernel that is user adaptable to generate user defined machine-learning algorithms.

14. The MLA integrated circuit of claim 1 wherein the mathematical structures include linear algebra constructs.

15. The MLA integrated circuit of claim 1 wherein the arithmetic engine includes a data computation unit (DCU) having a data path for multiplications, additions, and subtractions structured in stages with selectable operands, wherein the data path is selectably configurable by the kernel controller for each of the FSM kernels.

16. The MLA integrated circuit of claim 1 wherein the arithmetic engine includes a hardware-implemented coordinate rotation digital computer (CORDIC) for calculating exponential values, square root values, division values, and logarithmic values for data associated with the mathematical structures of the kernel controller.

17. The MLA integrated circuit of claim 1 wherein the arithmetic engine includes a hardware-implemented maximum and minimum block for determining maximum values and minimum values of data associated with the mathematical structures of the kernel controller.

18. The MLA integrated circuit of claim 1 further including a compression/decompression accelerator (CDA) implemented in hardware and coupled between a memory and the kernel controller for compressing data to be stored in the memory and for decompressing data retrieved from the memory.

19. The MLA integrated circuit of claim 18 wherein the memory is integral to the MLA integrated circuit.

* * * * *